(12) United States Patent
Lonergan

(10) Patent No.: US 6,357,884 B1
(45) Date of Patent: Mar. 19, 2002

(54) REFLECTIVE ELEMENT FOR STILL AND MOTION PHOTOGRAPHY

(75) Inventor: Frederick P. Lonergan, Tewksbury, MA (US)

(73) Assignee: Edward Quinn, Woburn, MA (US)

( * ) Notice: Subject to any disclaimer, the term of this patent is extended or adjusted under 35 U.S.C. 154(b) by 0 days.

(21) Appl. No.: 09/662,287

(22) Filed: Sep. 14, 2000

(51) Int. Cl.[7] .............................................. G02B 7/182
(52) U.S. Cl. ...................... 359/877; 359/872; 359/860; 359/879
(58) Field of Search ................................ 359/871, 872, 359/860, 879, 880, 88; 354/220, 293

(56) References Cited

U.S. PATENT DOCUMENTS

| | | |
|---|---|---|
| 1,099,820 A | 6/1914 | Ridings |
| 2,224,579 A | 12/1940 | Wheelan |
| 4,560,261 A | 12/1985 | Ueda et al. |
| 4,771,300 A | 9/1988 | Bryan |
| D309,833 S | 8/1990 | Wahl |
| D312,829 S | 12/1990 | Kuroki |
| 4,999,657 A | 3/1991 | Leur |
| 5,023,638 A | 6/1991 | Siegesleuthner et al. |
| 5,103,347 A * | 4/1992 | Lumbra et al. ............. 359/871 |
| 5,361,172 A | 11/1994 | Schissel et al. |
| 5,452,140 A * | 9/1995 | Kody ........................ 359/871 |
| 5,537,175 A | 7/1996 | Kamaya et al. |
| 5,589,280 A | 12/1996 | Gibbons et al. |
| 5,619,295 A | 4/1997 | Seya et al. |
| 5,629,810 A * | 5/1997 | Perry et al. .................. 359/872 |
| 5,768,645 A | 6/1998 | Kessler |

* cited by examiner

Primary Examiner—Mohammad Sikder
(74) Attorney, Agent, or Firm—O'Connell Law Firm

(57) ABSTRACT

A reflective element for coupling to still and motion cameras for providing a self-reflection to a photographic subject is founded on a reflective element body comprising an upstanding face panel coupled to a base panel in an L-shaped configuration. A thin plastic film with a reflective metal deposit thereon is affixed to the upstanding face panel for providing the self-reflection to the photographic subject. Ideally, the thin plastic film and the reflective metal deposit are crafted to form a one-way mirror so that a photographer's view of the subject is not obscured. The reflective element can be coupled to the camera by a hook and loop combination to allow the reflective element to be affixed to the camera by a pressing of the two together and to allow the two to be separated by a mere pulling apart. Preferred embodiments of the invention further include a button aperture in the base panel for allowing access to a shutter trigger button of the camera even while the reflective element is coupled thereto. Ideally, the upstanding face panel and the base panel are formed from a lightweight, non-glass material such as plastic.

16 Claims, 3 Drawing Sheets

REFLECTIVE ELEMENT FOR STILL AND MOTION PHOTOGRAPHY

FIELD OF THE INVENTION

The present invention relates most generally to photography. Stated more particularly, the present patent discloses and protects a lightweight, adjustable reflective element for use in still and motion photography.

BACKGROUND OF THE INVENTION

Persons who have attempted to take photographs, whether still or in motion, of young children will be well aware that a common difficulty in doing so is maintaining the attention and amusement of the child while the camera is aligned and focused and the photograph taken. Photographers often entertain children with toys, facial expressions, and other means immediately prior to taking the picture or activating the video camera to get the child into a happy and smiling disposition. Then, ideally before the child's pleasant mood has waned, the photographer attempts to align the camera and take the photograph.

Unfortunately, the time between the entertaining of the child and the taking of the photograph is often fatally long. A child who is attentive, happy, and smiling one moment can quickly become inattentive and possibly upset in the brief time it takes for the photographer to prepare to take the photograph. With this, the resulting photograph all too often fails to capture the image of the entertained child but instead depicts a distracted, frowning, or even crying child. As a result, expensive film and extensive periods of time can be exhausted in attempting to procure a useful photograph of a smiling, or at least not unhappy, child.

The experienced child caregiver will be aware, however, that children, particularly young children, are typically delighted and amazed by the mere sight of their own reflection. Indeed, a child seeing his or her own reflection can be playfully entertained for relatively long periods of time with substantially no need for adult intervention. Of course, capturing these moments of playful bewilderment, whether by still or motion photography, certainly would make for memorable and exceptionally useful still or motion photographs.

One knowledgeable in the art will appreciate that a number of prior art inventors have attempted to provide devices for providing a photographic subject, which of course would include a young child, with a reflection of him or herself while the photograph is being taken. For example, prior art disclosures, such as U.S. Pat. No. 4,999,657 for Methods and Apparatus for Taking Portraits, have revealed mirrors coupled to cameras by, for example, an adjustable mounting bracket with a first end pivotally fixed to a camera and a second end pivotally fixed to a mirror. Other disclosures, such as U.S. Pat. No. D312,829 for a Combination Camera and Mirror, reveal devices wherein a mirror is incorporated directly and fixedly into the face of the camera. Still other patents, such as U.S. Pat. No. 4,771,300 for a Camera Mirror, integrate at least the lens of a camera into the face of a relatively large mirror whereby a photographic subject can see nearly a full image of him or herself. Of course, these and further prior art devices are useful not only in photographing small children but also in allowing older subjects to view themselves to assist them in properly posing and appreciating their appearance during photographing.

These and further prior art devices certainly have contributed usefully to the present state of the art. Unfortunately, however, even when combined, the teachings of the prior art leave a number of needs left unmet and suffer from a number of disadvantages, particularly as they relate to photographing young children. For example, each of the prior art devices appears to teach employing a glass mirror. Although this usefully accomplishes the goal of providing a reflection to a subject, using a glass mirror relative to children certainly presents dangers that can render use of such a mirror ill advised. Furthermore, many prior art mirrors are coupled to cameras either integrally or by complicated, dedicated structures whereby they are useful relative to just a single camera. Even further, a plurality of prior art mirror arrangements are relatively complex in construction whereby one could expect them to be expensive in manufacture and sale. Further still, a number of the disclosed mirror structures can not be adjusted in their orientation relative to the camera whereby subjects only in an exactly aligned position can view their reflection in the mirror.

In light of these and even further disadvantages of the prior art, one will appreciate that, notwithstanding the plurality of mirror arrangements that have been disclosed by the prior art, there remains a need for an improved mirror arrangement. Indeed, it is clear that a mirror arrangement providing a solution to one or more of the deficiencies of the prior art would be useful. It is still more clear that a mirror for use relative to cameras that solves each and every deficiency left by the prior art while providing a number of heretofore unrealized advantages would represent a marked advance in the art.

SUMMARY OF THE INVENTION

Advantageously, the present invention is founded on the basic object of providing a reflective element for use in still and motion photography that meets each of the needs left by the prior art while providing a number of further advantages thereover.

A more particular object of the invention is to provide a reflective element that can make the photographing of young children and others easier and more effective by providing the photographic subject with a reflection of him or herself to entertain and delight younger subjects and to enable older subjects to pose most effectively.

A further object of the invention is to provide such a reflective element that is safe even when used relative to young photographic subjects.

Yet another object of the invention is to provide a reflective element that is light in weight whereby it does not adversely affect the balance or overall weight of a camera to which it is coupled.

A still further object of the invention is to provide a reflective element that is simple and convenient in construction and use, particularly as compared to prior art reflective elements.

Of course, these and further objects and advantages of the invention would be readily obvious not only to one skilled in the art who reviews the present disclosure and the accompanying drawing figures but also to one who has an opportunity to take advantage of an embodiment of the present invention.

In accomplishing the aforementioned objects, a most basic embodiment of the present invention for a reflective element for coupling to still and motion cameras for providing a self-reflection to a photographic subject is founded on a reflective element body with an upstanding face panel coupled to a base panel in an L-shaped configuration. With this, the reflective element can be affixed to the camera with the base panel in contact therewith and the upstanding face panel projecting therefrom. A means for providing a self-reflection to a photographic subject is operably associated with the upstanding face panel for providing a reflection from the generally planar front face of the upstanding face panel. In preferred embodiments, the base panel can have at least one button aperture therein for allowing access to a shutter trigger button of the camera even while the reflective element is coupled thereto.

The reflective element can be affixed to the camera by a variety of means including, for example, a hook and loop combination. Such a means advantageously allows the reflective element to be affixed to the camera by a mere pressing of the two together and for the reflective element to be separated from the camera by a mere pulling of the two apart. With this, the reflective element and the camera can be affixed together and separated without a need for tools or a manipulation of parts.

The means for providing a self-reflection to a photographic subject can comprise a thin plastic film affixed to the upstanding face panel with a reflective metal deposit disposed on the thin plastic film. Still further, the ideal means for providing a self-reflection can comprise a one-way mirror. With this, a photographic subject will be provided with a self-reflection while a photographer's view of the photographic subject will not be hindered. Also, the upstanding face panel and the base panel can be formed from a lightweight, non-glass material such as plastic so that the reflective element will not present a danger to photographers or photographic subjects and whereby the reflective element will not significantly affect the overall weight and balance of the camera.

With certain embodiments of the present invention for a reflective element for coupling to still and motion cameras generally described, one will appreciate that the foregoing discussion broadly outlines the more important features of the invention merely to enable a better understanding of the detailed description that follows and to instill a better appreciation of the inventor's contribution to the art. Before any particular embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

As is the case with many inventions, the present invention for a reflective element for use relative to still and motion cameras is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
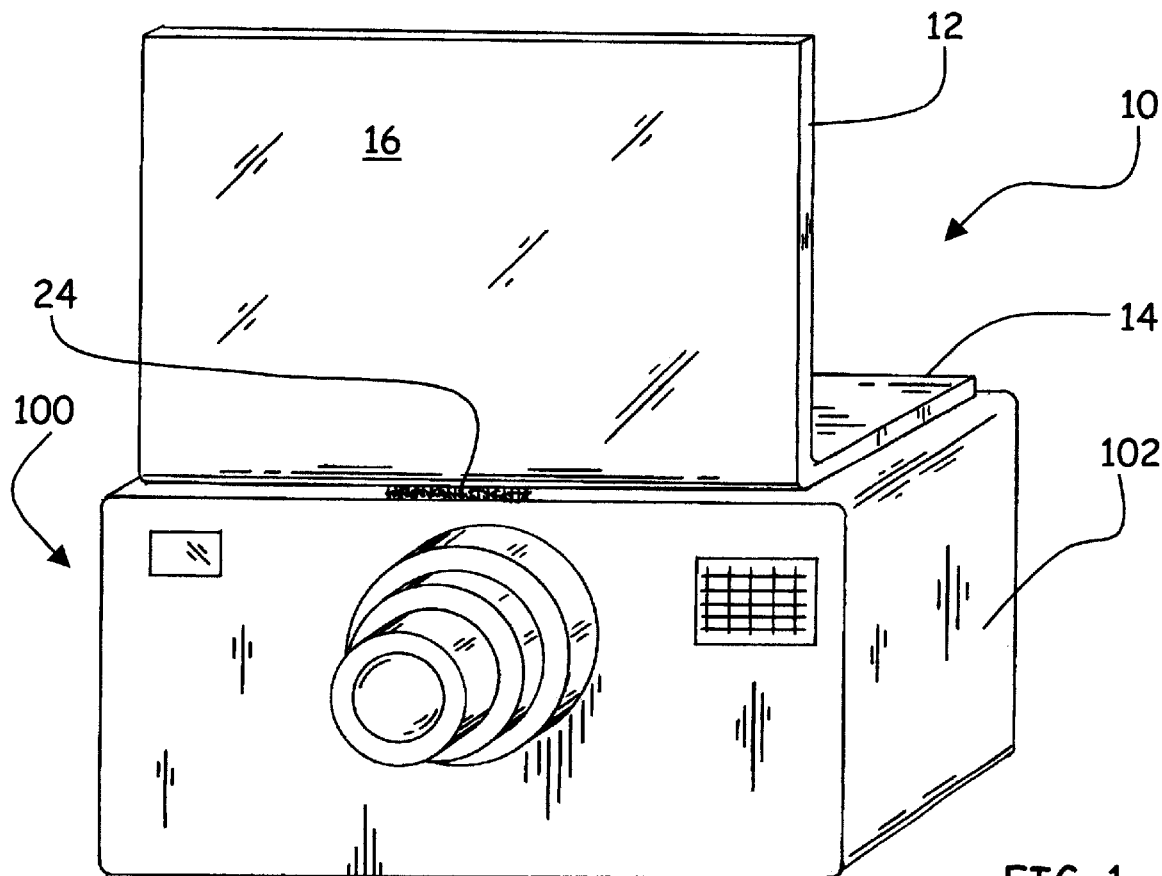
FIG. 1 is a perspective view of a reflective element for still and motion photography according to the present invention shown coupled to a camera.
Figure 2:
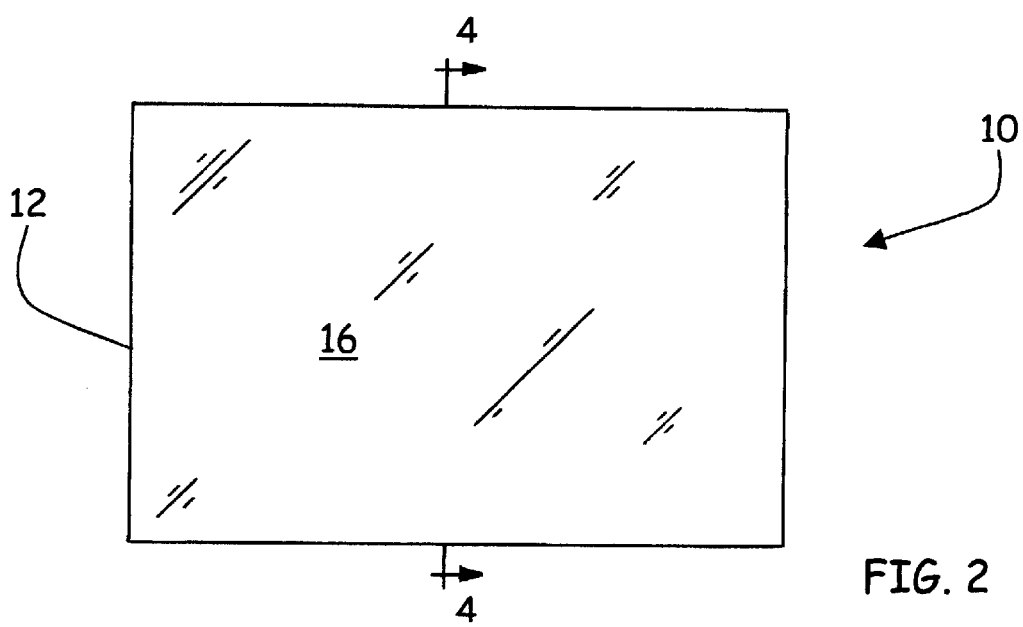
FIG. 2 is a view in front elevation of the reflective element of FIG. 1.

With this in mind and looking more particularly to the drawings, a preferred embodiment of the present invention for a reflective element for use in still and motion photography is indicated generally at 10 in FIG. 1 where it is shown employed relative to a camera 100, which in this case is a still camera. It must be clear, however, that since the present invention is in the reflective element 10 and not the camera 100, whether the camera 100 is a still camera or a motion camera is of little consequence. Therefore, although the camera 100 in FIG. 1 is a still camera, the present invention could be employed just as usefully relative to a motion camera.

Figure 3:
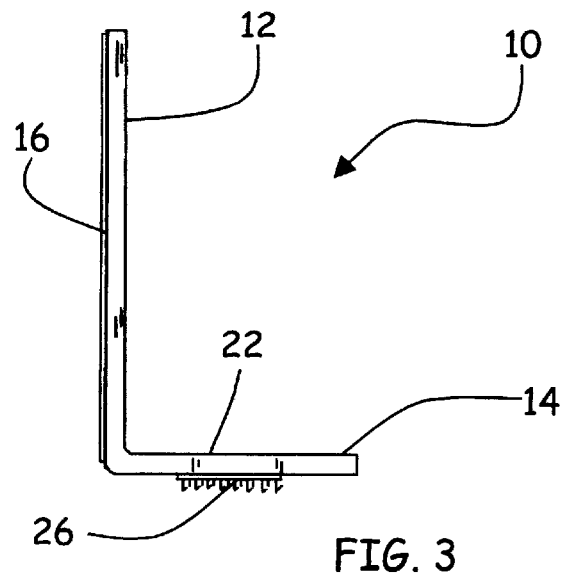
FIG. 3 is a view in side elevation of the reflective element of FIG. 1.
Figure 4:
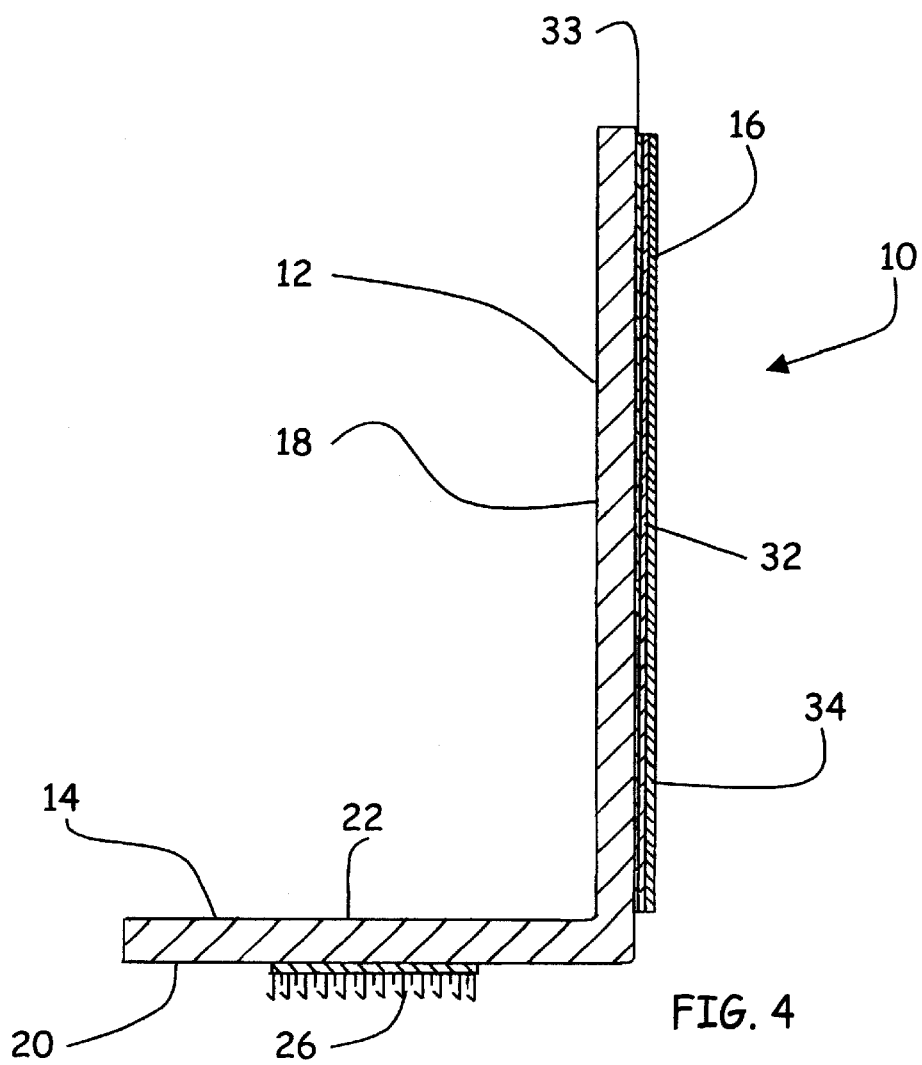
FIG. 4 is a cross-sectional view of the reflective element taken along the line 4—4 in FIG. 2.

By combined reference to FIGS. 1 and 3, one sees that the reflective element 10 has a body with an L-shaped cross section comprising a flat upstanding face panel 12 coupled at approximately a 90 degree angle to a flat base panel 14. The upstanding face panel 12 defines an upstanding, generally planar front face 16 that is opposite an upstanding, generally planar rear face 18. The base panel 14 defines a lower face 20 and an upper face 22. As one can see most clearly from the cross-sectional view of FIG. 4, the upstanding face panel 12 and the base panel 14 are formed form a single piece of material. In this preferred embodiment, the single piece of material comprises a panel of plastic, which is bent or formed in the overall L configuration of the reflective element 10. The plastic can be clear or opaque.

As one can perceive from FIGS. 1, the reflective element 10 is coupled to the camera 100 by a means for removably and replacably affixing the lower face 20 of the base panel 14 to the upper surface 102 of the camera 100. In this embodiment, the means for coupling the lower face 20 of the base panel 14 to the upper surface 102 of the camera 100 comprises a hook and loop combination 24. As one can see most clearly from FIGS. 5 and 6, which respectively comprise a bottom plan view of the reflective element 10 and a top plan view of the camera 100, the hook and loop combination 24 comprises an area of hook material 26 disposed on the lower face 20 of the base panel 14 and a mating area of loop material 28 disposed on the upper face 102 of the camera 100. Advantageously and in a marked departure from the prior art, the hook and loop combination 24 allows the reflective element 10 to be removed and replaced relative to the camera 100 quickly and easily and without a need for tools or for any manipulation of parts of the reflective element 10 or the camera 100. With this, when desired, one need only pull the two apart to separate and press them together to yield a secure coupling.

In this case, the areas of hook and loop material 26 and 28 happen to be singular round elements. Of course, other shapes and numbers of areas of hook and loop material 26 and 28 would be well within the scope of the invention. Furthermore, it is certainly true that a number of alternative means for removably and replacably coupling the reflective member 10 to the camera 100 might occur to one skilled in the art after reading this disclosure. For example, the means for removably and replacably coupling the reflective member 10 to the camera 100 alternatively could comprise a pressure sensitive adhesive or any other appropriate means.

Figure 5:
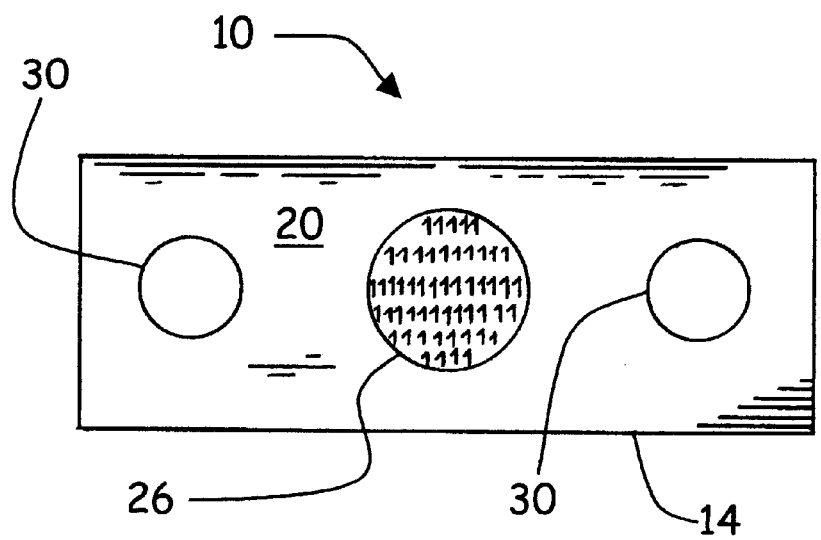
FIG. 5 is a bottom plan view of the reflective element of FIG. 1.
Figure 6:
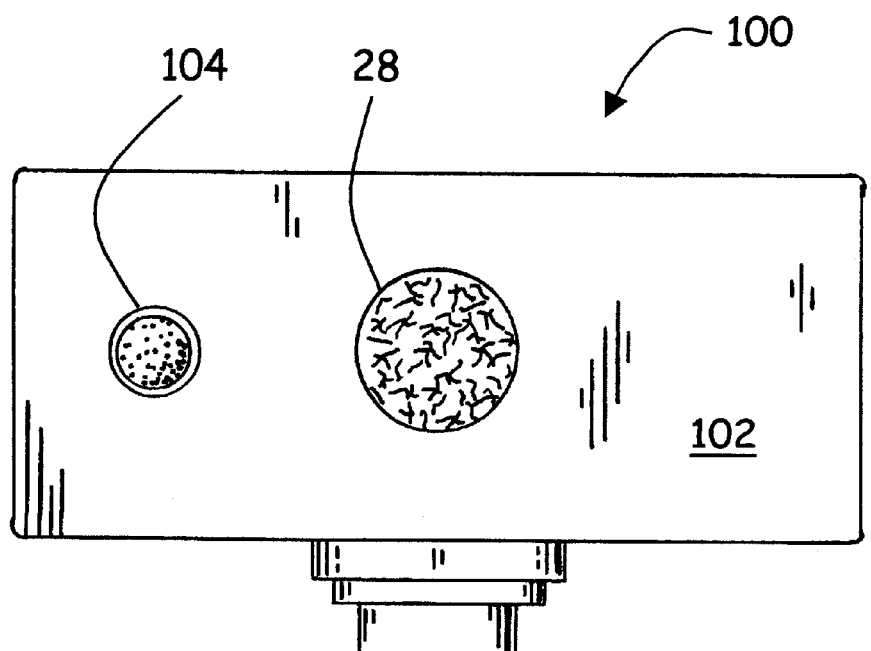
FIG. 6 is a top plan view of a camera adapted for coupling to the reflective element of FIG. 1.

Advantageously, as FIG. 5 shows, the base panel 14 of the reflective element 10 has a pair of button apertures, each indicated at 30, therein that are disposed adjacent to the first and second ends of the base panel 14 thereby to align with the shutter trigger button 104 of a camera 100. With this, as is of course critical, a user will be able to access the shutter trigger button 104 even while the reflective element 10 is in place. Furthermore, the reflective element 10 can accommodate cameras 100 with shutter trigger buttons 104 at either end of the camera 100.

To be complete, one will note that, although the button apertures 30 in this preferred embodiment are generally round, the button aperture 30 certainly could pursue a variety of alternative shapes to accommodate shutter trigger buttons 104 of different configurations or locations. Of course, it is also possible that there could be just one button aperture 30 or more than two button apertures 30. Where just one button aperture 30 is provided, one could well imagine that the button aperture 30 could actually approximate an elongate slot whereby the single button aperture 30 would accommodate cameras 100 with shutter trigger buttons 104 in a variety of locations.

In what may reasonably be considered a most critical aspect of the reflective element 10, the planar front face 16 of the upstanding face panel 12 is provided with a means for providing a reflection of a photographic subject to the photographic subject. In this embodiment, the means for providing a reflection comprises thin plastic film 32 disposed over substantially the entire planar front face 16 of the upstanding face panel 12 that has a reflective metal deposit 34 disposed over substantially the entire thin plastic film 32. Of course, the thin plastic film 32 can be affixed to the planar front face 16 of the upstanding face panel 12 in a number of ways that would readily occur to one skilled in the art. For example, the thin plastic film 32 can be secured in place by a layer of adhesive 33 such as a transparent epoxy or by double-sided tape.

The thin plastic film 32 can be a polyester film 0.025 mm thick such as that manufactured by E.I. DuPont De Nemours & Co. under the trademark MYLAR. The reflective metal deposit 34 can be, by way of example, vacuum-deposited silver or aluminum (2 to 2.2 density units, for example), with the material and disposition characteristics depending upon desired reflectivity and cost considerations. Under this ideal embodiment, the means for providing a reflection is crafted by methods well known to the art to define a one-way mirror with a reflection being provided on the planar front face 16 of the upstanding face panel 12 while allowing a photographer to see through the upstanding face panel 12 from the side of the planar rear face 18. With this, the photographer's view of his or her subject will not be hindered or obscured by the reflective element 10.

From the foregoing, one will appreciate that the present invention achieves a number of advantages over the prior art. For example, the reflective element 10 can help make the photographing of young children and others easier and more effective by providing the photographic subject with a reflection of him or herself to entertain and delight younger subjects and to enable older subjects to pose most effectively. Also, since the face panel 12 and the base panel 14 are formed from a rigid plastic and not glass, they are safer to use, particularly relative to young photographic subjects. Furthermore, with a body formed substantially entirely of plastic, the reflective element 10 is light in weight such that it does not adversely affect the balance or overall weight of a camera 100 to which it is coupled. Even further, the reflective element 10 is exceedingly simple and convenient in construction and use, particularly as compared to prior art reflective elements. Even further still, by providing a one-way mirror effect, the reflective element 10 advantageously allows a photographer to view his or her subject without obstruction. Yet further, with the button apertures 30, the photographic element 10 enables access to the shutter trigger button 104 of a camera 100 even while the reflective element 10 is in place. Additionally, by employing a means for removably and replaceably coupling the reflective element 10 to a camera 100 that allows the reflective element 10 to be removed by a mere pulling thereon and to be installed by a mere pressing thereon, the reflective element 10 can be easily removed when necessary and can be used relative to multiple different cameras 100 when desired. Naturally, one skilled in the art will be aware of still further advantages of the present invention in light of this disclosure.

It will be clear that the present invention has been shown and described with reference to certain preferred embodiments that merely exemplify the broader invention revealed herein. Certainly those skilled in the art can conceive of alternative embodiments. For instance, those with the major features of the invention in mind could craft embodiments that incorporate those major features while not incorporating all of the features included in the preferred embodiments.

With the foregoing in mind, the following claims are intended to define the scope of protection to be afforded the inventor. The claims shall be deemed to include equivalent constructions insofar as they do not depart from the spirit and scope of the invention. A plurality of the following claims express certain elements as means for performing a specific function, at times without the recital of structure or material. As the law demands, these claims shall be construed to cover not only the corresponding structure and material expressly described in the specification but also equivalents thereof.

What is claimed is:

1. A reflective element for coupling to still and motion cameras for providing a self-reflection to a photographic subject, the reflective element comprising:
    a reflective element body comprising an upstanding face panel with a generally planar front face and a rear face and a base panel coupled to the upstanding face panel wherein the upstanding face panel and the base panel are coupled in an L-shaped cross section whereby the reflective element can be coupled to a camera with the base panel in contact with the camera and the upstanding face panel projecting therefrom;
    a means for providing a self-reflection to a photographic subject wherein the means for providing a self-reflection is operably associated with the upstanding face panel for providing a reflection from the generally planar front face of the upstanding face panel; and
    a means for coupling the reflective element body to a camera.

2. The reflective element of claim 1 wherein the base panel has at least one button aperture therein for allowing access to a shutter trigger button of the camera even while the reflective element is coupled to the camera.

3. The reflective element of claim 1 wherein the means for coupling the reflective element body to the camera comprises a means for removably and replaceably affixing the reflective element to the camera without a need for tools.

4. The reflective element of claim 3 wherein the means for coupling the reflective element body to the camera comprises a means for affixing the reflective element to the camera by a pressing of the reflective element body and the camera together and for separating the reflective element from the camera by a pulling of the reflective element body and the camera apart.

5. The reflective element of claim 4 wherein the means for coupling the reflective element body to the camera comprises a hook and loop combination.

6. The reflective element of claim 5 wherein the upstanding face panel is formed from a lightweight, non-glass material whereby the reflective element will not present a danger to photographers or photographic subjects and whereby the reflective element will not significantly affect the overall weight and balance of the camera.

7. The reflective element of claim 6 wherein the upstanding face panel is formed from a plastic.

8. The reflective element of claim 5 wherein the means for providing a self-reflection to a photographic subject comprises a thin plastic film with a reflective metal deposit disposed thereon.

9. The reflective element of claim 1 wherein the means for providing a self-reflection to a photographic subject comprises a one-way mirror whereby a photographic subject will be provided with a self-reflection while a photographer's view of the photographic subject will not be hindered.

10. The reflective element of claim 1 wherein the means for providing a self-reflection to a photographic subject comprises a thin film affixed to the upstanding face panel.

11. A reflective element for coupling to still and motion cameras for providing a self-reflection to a photographic subject, the reflective element comprising:

a reflective element body comprising an upstanding face panel with a generally planar front face and a rear face and a base panel coupled to the upstanding face panel wherein the upstanding face panel and the base panel are coupled in an L-shaped cross section whereby the reflective element can be coupled to a camera with the base panel in contact with the camera and the upstanding face panel projecting therefrom;

a means for providing a self-reflection to a photographic subject wherein the means for providing a self-reflection is operably associated with the upstanding face panel for providing a reflection from the generally planar front face of the upstanding face panel; and a means for affixing the reflective element to the camera by a pressing of the reflective element body and the camera together and for separating the reflective element from the camera by a pulling of the reflective element body and the camera apart.

12. The reflective element of claim 11 wherein the base panel has at least one button aperture therein for allowing access to a shutter trigger button of the camera even while the reflective element is coupled to the camera.

13. The reflective element of claim 11 wherein the means for providing a self-reflection to a photographic subject comprises a thin film affixed to the upstanding face panel.

14. The reflective element of claim 13 wherein the upstanding face panel is formed from a lightweight, non-glass material whereby the reflective element will not present a danger to photographers or photographic subjects and whereby the reflective element will not significantly affect the overall weight and balance of the camera.

15. The reflective element of claim 13 wherein the means for providing a self-reflection to a photographic subject comprises a thin plastic film with a reflective metal deposit disposed thereon.

16. The reflective element of claim 11 wherein the means for providing a self-reflection to a photographic subject comprises a one-way mirror whereby a photographic subject will be provided with a self-reflection while a photographer's view of the photographic subject will not be hindered.

* * * * *